(12) United States Patent
Richards et al.

(10) Patent No.: US 8,859,675 B2
(45) Date of Patent: *Oct. 14, 2014

(54) DISPERSANTS

(75) Inventors: Stuart N. Richards, Frodsham (GB); Andrew J. Shooter, Altrincham (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/517,633

(22) PCT Filed: Dec. 3, 2007

(86) PCT No.: PCT/US2007/086233
§ 371 (c)(1), (2), (4) Date: Jun. 4, 2009

(87) PCT Pub. No.: WO2008/070601
PCT Pub. Date: Jun. 12, 2008

(65) Prior Publication Data
US 2010/0324206 A1    Dec. 23, 2010

Related U.S. Application Data

(60) Provisional application No. 60/868,402, filed on Dec. 4, 2006.

(51) Int. Cl.
| | | |
|---|---|---|
| C08G 18/28 | (2006.01) | |
| C08L 75/00 | (2006.01) | |
| C08G 18/08 | (2006.01) | |
| C08L 63/00 | (2006.01) | |
| C08G 18/16 | (2006.01) | |
| C08G 18/10 | (2006.01) | |
| C08G 18/30 | (2006.01) | |
| C09D 17/00 | (2006.01) | |
| C08G 18/46 | (2006.01) | |
| C09D 7/02 | (2006.01) | |
| C08G 18/76 | (2006.01) | |
| C09D 175/04 | (2006.01) | |
| B01F 17/00 | (2006.01) | |
| C08G 18/50 | (2006.01) | |
| C08G 18/32 | (2006.01) | |

(52) U.S. Cl.
CPC .......... *C08G 18/3275* (2013.01); *C09D 17/002* (2013.01); *C08G 18/4615* (2013.01); *C09D 7/02* (2013.01); *C08G 18/7621* (2013.01); *C08G 18/0814* (2013.01); *C09D 175/04* (2013.01); *C08G 18/0852* (2013.01); *B01F 17/005* (2013.01); *G08G 18/284* (2013.01); *C08G 18/5024* (2013.01); *C08G 18/2865* (2013.01)
USPC ........... 524/590; 524/589; 524/871; 523/418; 528/48; 528/49; 528/53; 528/60

(58) Field of Classification Search
CPC .............................. C09D 17/002; B01F 17/005
USPC ............. 524/589, 590, 871; 523/418; 528/48, 528/49, 53, 60
See application file for complete search history.

(56) References Cited

U.S. PATENT DOCUMENTS

| | | | | |
|---|---|---|---|---|
| 4,647,647 | A | * | 3/1987 | Haubennestel et al. ........ 528/83 |
| 4,942,213 | A | * | 7/1990 | Haubennestel et al. ........ 528/28 |
| 5,874,502 | A | | 2/1999 | Carlson et al. |
| 5,891,578 | A | | 4/1999 | Amirsakis |

FOREIGN PATENT DOCUMENTS

| | | | | |
|---|---|---|---|---|
| CA | 1069237 | * | 1/1980 | ............. C08G 18/10 |
| WO | 2004/104064 A1 | | 12/2004 | |
| WO | WO2004104064 A2 | * | 12/2004 | ............. C08G 18/08 |

* cited by examiner

*Primary Examiner* — Patrick Ryan
*Assistant Examiner* — Aaron Greso
(74) *Attorney, Agent, or Firm* — Samuel B. Laferty

(57) ABSTRACT

The present invention provides a non-aqueous composition containing a particulate solid, an organic medium and a polyurethane dispersant having laterally attached pendant groups with tertiary amine group(s), an essentially linear backbone and laterally attached solvent-solubilising side chains of a polyester or polyether including mixtures of such side chains.

15 Claims, 1 Drawing Sheet

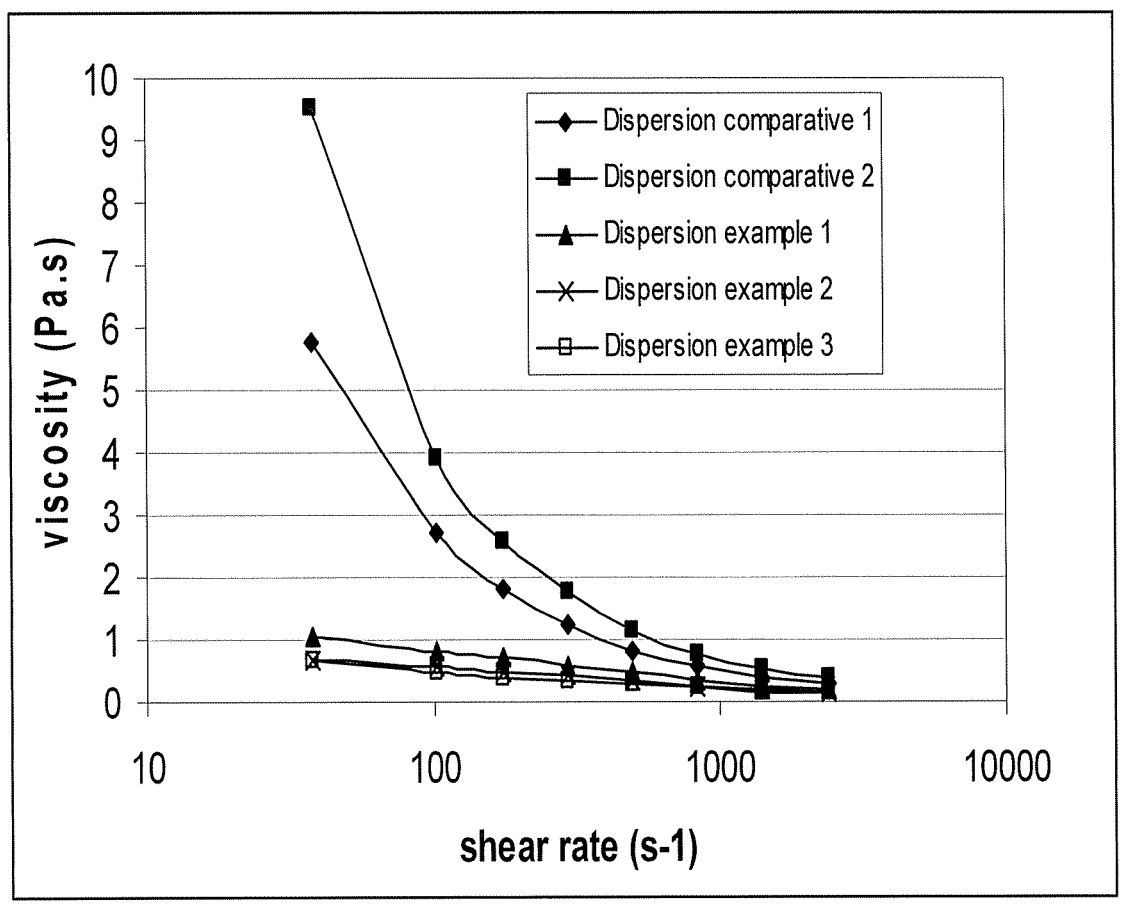

DISPERSANTS

CROSS REFERENCE TO RELATED APPLICATION

This application claims priority from PCT Application Ser. No. PCT/US2007/86233 filed on Dec. 3, 2007, which claims the benefit of U.S. Provisional Application No. 60/868,402 filed on Dec. 4, 2006.

FIELD OF INVENTION

The present invention relates to polyurethane dispersants, to dispersions, millbases, paints and inks containing a particulate solid dispersed in a non-aqueous organic medium, particularly a polar organic medium, including inks for use in non-contact printing processes such as "Drop-on-demand" printing process. In particular, the dispersants have laterally attached tertiary amine groups, an essentially linear backbone, and laterally attached side-chains of solvent soluhilizing polyester or polyether chains including mixtures of such side chains.

BACKGROUND OF THE INVENTION

A polyurethane containing polyoxyethylene side-chains is known and has been described in the patent literature. For example, EP 060,430 discloses a process for making a polyurethane having polyalkylene oxide side-chains characterised in that the polyalkylene oxide used as starting alcohol has at least two free hydroxyl groups separated by not more than 3 carbon atoms, which hydroxy groups react with diisocyanates. The polyurethane may be used to stabilise or destabilise foams, emulsions and dispersions. They may also be used with pigments and fillers.

JP1995179801A discloses a water soluble acrylic graft copolymer with a polyurethane backbone. The grafted copolymer has carboxylic acid functional groups that may be incorporated into the backbone or within the grafted acrylic portion.

WO 2004/104064 discloses polyurethane dispersants having an essentially linear backbone with laterally attached solvent-solubilizing side chains of polyester, polyacrylic, polyether or polyolefin including mixtures of such side chains.

SUMMARY OF THE INVENTION

According to the invention, there is provided a non-aqueous composition comprising a particulate solid, an organic medium and a polyurethane dispersant having one or more an essentially linear backbone with laterally attached solvent-solubilizing side chains of polyester or polyether including mixtures of such side chains, and pendant side chain group(s) with tertiary amine. The polyurethane dispersant is also described separate from the non-aqueous composition.

BRIEF DESCRIPTION OF THE DRAWINGS

FIG. 1 illustrates how the viscosity of dispersions (as set forth in Table 1) prepared from the comparative examples and the examples of the invention compare at various different shear rates.

DETAILED DESCRIPTION OF THE INVENTION

According to the invention, there is provided a non-aqueous composition comprising a particulate solid, an organic medium and a polyurethane (PU) dispersant having an essentially linear backbone with laterally attached solvent-solubilizing side chains of polyester or polyether including mixtures of such side chains and having pendant group or groups with tertiary amine. The optimum choice of the solvent solubilising side chain will be dependent on the polarity of the organic medium.

It is known from WO 2004/014790 that comb microstructure polyurethane dispersants can utilize polyacrylate and/or polyolefin pendant side chains either alone or in combination with the polyether or polyester chains described herein. Those other side chains can be utilized with pendant side chains having tertiary amine. The polyacrylate and polyolefin side chains are described in WO 2004/014790 page 2, line 15, to page 3 line 5; page 4, line 6 to page 5, line 28; page 6, line 16 to page 7, line 2; page 11, lines 13-30; page 18, line 21 to page 19, line 15; and page 20 lines 3-14.

In one embodiment, the non-aqueous composition optionally contains 5 wt. % or less water, preferably less than 2 wt. %, more preferably less than 0.5 wt. % and most preferably no water.

Whereas, the polyester or polyether side chains may contain a terminating hydroxy group remote from the polyurethane backbone, it is much preferred that such chains carry a terminating group which is not reactive with isocyanates and especially a $C_{1-50}$-hydrocarbyl group since this restricts any cross-linking during the preparation of the dispersant. The hydrocarbyl group may be optionally branched alkyl, cycloalkyl, aryl or aralkyl.

The cycloalkyl group is preferably $C_{3-6}$-cycloalkyl such as cyclopropyl and especially cyclohexyl. The aryl group is preferably $C_{6-10}$-aryl such as naphthyl and especially phenyl which may be substituted by halogen, $C_{1-20}$-alkyl or $C_{1-20}$-alkoxy. The aralkyl group is preferably 2-phenylethyl and especially benzyl where the phenyl ring is optionally substituted by halogen, $C_{1-20}$-alkyl or $C_{1-20}$-alkoxy.

The length of the alkyl terminating group of the polyester or polyether chain depends to a large extent on the nature of the organic medium. Thus, for example, when the organic medium is a polar organic liquid, the hydrocarbyl group is preferably $C_{1-12}$-alkyl which may be linear or branched. The hydrocarbyl group includes ethyl, propyl, isopropyl or mixtures thereof. When the polyurethane dispersant contains polyether side chains, it is preferred that the terminating alkyl group is $C_{1-4}$ alkyl, for instance methyl, because of their ready commercial availability. When the organic medium is a non-polar organic liquid, it is preferred that the terminating alkyl group contains greater than 8 carbon atoms. It is also preferred that the alkyl group is branched since this aids solubility in the non-polar organic liquid.

The polyether chain is preferably poly($C_{2-4}$-alkylene oxide) which contains less than 60%, more preferably less than 40%, and especially less than 20% by weight ethylene oxide relative to the total weight of the poly($C_{2-4}$-alkylene oxide) chain.

The alkylene moiety of the ($C_{2-4}$-alkylene oxide) group may be linear or preferably branched and may be obtained by (co)polymerisation of alkylene oxides such as ethylene oxide, propylene oxide and butylene oxide or from tetrahydrofuran. Copolymers may be random or block copolymers.

Preferably, the polyether chain is obtainable from propylene oxide. It is also preferred that the polyether chain of the dispersant is obtainable from a poly($C_{2-4}$-alkylene oxide) mono-$C_{1-10}$-alkyl ether and especially a methyl or butyl ether.

The polyester chain is preferably obtainable or obtained from a hydroxy carboxylic acid containing from 1 to 26 carbon atoms or a lactone thereof. The choice of hydroxy carboxylic acid is largely influenced by the nature of the organic medium itself. Where the organic medium is a polar organic liquid, the hydroxy carboxylic acid preferably contains up to 8 carbon atoms, and where the organic medium is a non-polar organic liquid, the hydroxy carboxylic acid preferably contains more than 8 carbon atoms. It is particularly preferred that the polyester chain is obtainable from two or more different hydroxy carboxylic acids or lactones thereof since this aids solubility in the organic medium. The hydroxy carboxylic acid may be saturated or unsaturated, linear or branched.

Examples of suitable hydroxy carboxylic acids are glycolic acid, lactic acid, 5-hydroxy valeric acid, 6-hydroxy caproic acid, ricinoleic acid, 12-hydroxy stearic acid, 12-hydroxydodecanoic acid, 5-hydroxydodecanoic acid, 5-hydroxydecanoic acid and 4-hydroxydecanoic acid.

Examples of suitable lactones are β-propiolactone and optionally $C_{1-6}$-alkyl substituted δ-valerolactone and ε-caprolactone such as β-methyl-δ-valerolactone, δ-valerolactone, ε-caprolactone, 2-methyl, 3-methyl, 4-methyl, 5-test butyl, 7-methyl-4,4,6-trimethyl- and 4,6,6-trimethyl-ε-caprolactone, including mixtures thereof.

Polyester chains derivable from δ-valerolactone and ε-caprolactone are especially preferred.

By way of an obvious variant, the polyester or polyether lateral side chains may themselves be mixtures of such chains. Thus, for example, the polyester side chains may contain a polyether moiety and vice-versa.

The number-average molecular weight of the lateral polyester or polyether side chains in the polyurethane dispersant is preferably not greater than 10,000 Daltons, more preferably not greater than 4,000 and especially not greater than 2,500. It is also prepended that the number-average molecular weight of the lateral polyester or polyether side chains is not less than 300, more preferably not less than 600 and especially not less than 800.

As disclosed hereinbefore, the backbone of the polyurethane is essentially linear. Therefore, the isocyanates from which the dispersant is obtainable preferably have a functionality of from 2.0 to 2.5, more preferably from 2.0 to 2.1 and especially approximately 2.0.

The lateral side chain polyester or polyether chains are connected to polyurethane backbone by oxygen and/or nitrogen atoms which are the residue of terminating hydroxy and amino (primary and secondary) groups of the polyester or polyether.

When the lateral side chain is a polyether, it is preferably the residue of a polyether which contains either two hydroxyl groups or one hydroxyl and one secondary amino group which react with isocyanates at one end of the polyether chain. The hydroxyl and amino groups are preferably separated by up to 6 carbon atoms. When the polyether contains two hydroxyl groups which react with isocyanates, they are preferably separated by up to 17 atoms, especially 16 carbon atoms and one nitrogen atom. It is also preferred that the two hydroxyl groups are separated by not less than 5 atoms, especially 4 carbon atoms and one nitrogen atom. It is also possible to prepare the dispersant from a polyether which contains two amino groups (i.e., primary and/or secondary amino groups) which react with isocyanates but this is less preferred.

When the lateral side chain is a polyester, it is preferably the residue of the polyester which contains two hydroxyl groups at one end of the polyester chain which react with isocyanates. The hydroxyl groups are also preferably separated by up to 17 atoms, especially 16 carbon atoms and one nitrogen atom. It is especially preferred that the two hydroxyl groups are separated by not less than 5 atoms.

The dispersant also contains tertiary amine groups, including salts thereof, which are remote from the linear backbone of the PU comb polymer. Optionally, the tertiary amine group may also be quaternised. Inclusion of such groups into the polyurethane dispersant has been found to improve the dispersion of some particulate solids in organic liquids. The amount of tertiary amine groups in the polyurethane dispersant remote from the linear backbone is preferably from 10 to 180, more preferably from 20 to 110 and especially from 20 to 70 milliequivalents for each 100 g polyurethane dispersant. (The PU dispersant may also optionally contain other tertiary amine groups which are incorporated in the linear polyurethane backbone).

The tertiary amine may be quaternised with any known quaternising agent. Preferred quaternising agents are alkyl halides, aralkyl halides, dialkyl carbonates, dialkyl sulphates or epoxides. Particularly preferred quaternising agents are dimethyl sulphate, benzyl chloride or styrene oxide.

It is preferred that the tertiary amine groups within the polyurethane are quaternised to some extent.

When there is one tertiary amine group present, e.g., in the later defined component c) of the polyurethane, it is preferred that the extent of quaternisation of these groups in the polyurethane is >20%, it is more preferred the extent of quaternisation is >45% and most preferred that it is >80%.

When there is more than one tertiary amine group present, e.g., in the later defined component c) of the polyurethane, it is preferred that the extent of quaternisation of these groups in the polyurethane is >10%, it is more preferred the extent of quaternisation is >20% and most preferred that it is >40%.

The polyurethane dispersant may also contain the residue of formative compounds having a number average molecular weight of from 32 to 3,000 together with two groups which react with isocyanates.

The polyurethane dispersant may also have terminal polyester, polyether, polyacrylate or polyolefin chains. Such chains are similar to those described hereinbefore for the lateral chains but are obtainable from compounds having only one group which reacts with isocyanates.

The total weight percentage of the solvent-soluble lateral and terminal chains in the polyurethane dispersant is preferably not less than 20%, more preferably not less than 30% and especially not less than 40%. It is also preferred that the total weight percentage of solvent-soluble lateral and terminal chains in the polyurethane dispersant is not greater than 90%, more preferably not greater than 80%, for instance 45% to 80% or 60% to 78%. In one embodiment, the total weight percentage of solvent-soluble lateral and terminal chains in the polyurethane dispersant is not greater than 70%, for instance 55% to 65%.

The weight percentage of solvent-soluble lateral chains in the polyurethane dispersant is preferably riot less than 5%, more preferably not less than 15% and especially not less than 25% or not less than 35%.

The particulate solid present in the composition may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, fire retardants such as those used in plastics materials and biocides, agrochemicals and pharmaceuticals which are applied as dispersions in organic media.

A preferred particulate solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, and iron oxides.

Examples of organic pigments are those from the azo, disazo, condensed azo, thioindigo, indanthrone, isoindanthrone, anthanthrone, anthraquinone, isodibenzanthrone, triphendioxazine, quinacridone, perylene, diketopyrrolopyrrol (DPP), and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, anthraquinones, quinacridones, perylene, diketopyrrolopyrrol (DPP), and carbon blacks.

Pigments with an acidic surface are preferred such as oxidized carbon blacks.

Other preferred particulate solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; agrochemicals such as the fungicides flutriafen, carbendazim, chlorothalonil and mancozeb and fire retardants such as aluminium trihydrate and magnesium hydroxide.

The organic medium present in the composition is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al., in Journal of Paint Technology, Vol. 38, 1966, at page 269. Such organic media generally have a hydrogen bonding number of 5 or more as defined in the above mentioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14, on pages 39-40, and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, heptane, octane, decane, petrolium distillates such as white spirit, mineral oils, vegetable oils and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde.

The resin may also be an unsaturated polyester resin including the so-called sheet moulding compounds and bulk moulding compounds which may be formulated with reinforcing fibres and fillers. Such moulding compounds are described in DE 3,643,007 and the monograph by P. F. Bruins entitled "Unsaturated Polyester Technology", Gordon and Breach Science publishers, 1976, pages 211 to 238.

If desired, the dispersions may contain other ingredients, for example, resins (where these do not already constitute the organic medium) binders, fluidising agents (such as those described in GB-A-1508576 and GB-A-2108143), anti-sedimentation agents, plasticizers, levelling agents and preservatives.

The composition typically contains from 5 to 95% by weight of the particulate solid, the precise quantity depending on the nature of the solid and the relative densities of the solid and the organic medium. For example, a composition in which the solid is an organic material, such as an organic pigment, preferably contains from 15 to 60% by weight of the solid whereas a composition in which the solid is an inorganic material, such as an inorganic pigment, filler or extender, preferably contains from 40 to 90% by weight of the solid based on the total weight of composition.

The composition is preferably prepared by milling the particulate solid in the organic medium at a temperature which is not greater than 40° C. and especially not greater than 30° C. However, when the solid is a crude phthalocyanine pigment such as copper phthalocyanine, it is sometimes preferable to carry out the milling in an organic liquid at a temperature between 50 and 150° C. since greener and brighter shades may be obtained. This is particularly the case where the organic liquid is a high boiling aliphatic and/or aromatic distillate.

The composition may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either of the organic medium or the dispersant, the other ingredient or ingredients then being added and the mixture being agitated to provide the dispersion.

If the composition is required in dry form, the liquid medium is preferably volatile, so that it may be readily removed from the particulate solid by a simple separation means such as evaporation. It is preferred, however, that the composition comprises the liquid medium.

If the dry composition consists essentially of the dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20%, and especially not greater than 10% by weight dispersant based on the weight of the particulate solid.

As described hereinbefore, the compositions are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

The polyurethane dispersants may be prepared by any method known to the art and are obtainable or obtained by reacting together:

a) one or more polyisocyanates having an average functionality of from 2.0 to 2.5;
b) one or more compounds having at least one polyester or polyether chain and at least two groups which react with isocyanates which are located at one end of the compound such that the polyester or polyether chain(s) is laterally disposed in relation to the polyurethane polymer backbone;
c) one or more compounds having a tertiary amino group of formula,

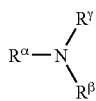

including salts thereof. $R^\alpha$ and $R^\beta$ are each independently alkyl, aralkyl, cycloalkyl or aryl and do not contain groups which can react with isocyanates. $R^\alpha$ and $R^\beta$ maybe taken together to form a cyclic structure containing 5 to 8 carbon atoms. $R^\gamma$ is a moiety that contains at least two groups which react with isocyanates;

d) optionally, one or more formative compounds having a number average molecular weight of from 32 to 3,000 which have at least two groups which react with isocyanates;

e) optionally, one or more compounds which act as chain terminators which contain one group which reacts with isocyanates;

f) optionally, one or more compounds which act as chain terminators which contain a single isocyanate group.

As noted hereinbefore, the polyurethane dispersants have an essentially linear backbone and consequently it is much preferred that components (b), (c) and (d) contain only two groups which react with isocyanates. It is also preferred that component (a) has a functionality of from 2.1 to 2.0 and especially about 2 since this also limits any cross-linking between chains of the polyurethane dispersants.

It is preferred that component c) is quaternised before or after incorporation into the PU. It is especially preferred that component c) is quaternised after incorporation into the PU.

It is preferred that $R^\gamma$ contains 2 to 2.1 groups that react with isocyanates. It is especially preferred that $R^\gamma$ contains precisely 2 groups that react with isocyanates.

An acid may be added to form a salt with the tertiary amine moiety in component c).

Preferably, component (a) is a diisocyanate or mixtures of diisocyanates such as toluene diisocyanate (TDI), isophorone diisocyanate (IPDI), hexanediisocyanate (HDI), α,α-tetramethylxylene diisocyanate (TMXDI), diphenylmethane-4,4'-diisocyanate (4,4'-MDI), diphenylmethane-2,4'-diisocyanate (2,4'-MDI) and dicyclohexylmethane-4,4'-diisocyanate (HMDI). Preferably, component (a) is either TDI or IPDI or MDI.

The compound having a polyether chain which is component (b) is preferably poly($C_{2-3}$-alkylene oxide) which contains less than 60% poly(ethylene oxide) and also preferably contains two groups which react with isocyanates. Preferably, the amount of ethylene oxide is less than 40% and especially less than 20% by weight of the poly($C_{2-3}$-alkylene oxide) chain. There are a number of ways of incorporating a polyether lateral chain into an organic compound which contains these groups which react with isocyanates.

Thus, in the case where the two groups which react with isocyanates are both hydroxyl, a poly($C_{2-4}$-alkylene oxide) chain may be conveniently attached by isocyanates having a functionality of two or more. Compounds of this type are described in U.S. Pat. No. 4,794,147, which involves sequentially reacting a mono-functional polyether with a polyisocyanate to produce a partially capped isocyanate intermediate and reacting the intermediate with a compound having at least one active amino hydrogen and at least two active hydroxyl groups.

One preferred class of compound of this type may be presented by the formula 1.

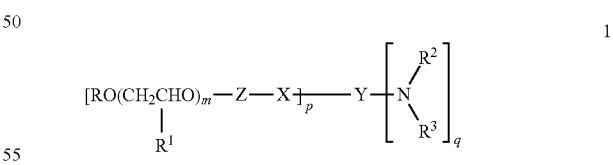

wherein
R is $C_{1-20}$-hydrocarbyl group;
$R^1$ is hydrogen, methyl or ethyl of which less than 60% is hydrogen;
$R^2$ and $R^3$ are each, independently, $C_{1-8}$-hydroxyalkyl;
Z is $C_{2-4}$-alkylene;
X is —O— or —NH—;
Y is the residue of a polyisocyanate;
m is from 5 to 150;
p is from 1 to 4; and
q is 1 or 2.

R may be alkyl, aralkyl, cycloalkyl or aryl.

When R is aralkyl, it is preferably benzyl or 2-phenylethyl.

When R is cycloalkyl it is preferably $C_{3-8}$-cycloalkyl such as cyclohexyl.

When R is aryl it is preferably naphthyl or phenyl.

When R is alkyl, it may be linear or branched and preferably contains not greater than 12, more preferably not greater than 8 and especially not greater than 4 carbon atoms. It is especially preferred that R is methyl or butyl.

The $C_{2-4}$-alkylene radical represented by Z may be ethylene, trimethylene, 1,2-propylene or butylene.

Preferably, m is not less than 10. It is also preferred that m is not greater than 100 and especially not greater than 80.

When q is 2, it is possible to link two different polyurethane polymer chains but it is much preferred that q is 1.

When the polyisocyanate has a functionality which is greater than 2, the compound which is component (b) may carry more than one poly (alkylene oxide) chain. However, it is much preferred that p is 1, q is 1 and that Y is the residue of a diisocyanate.

When $R^1$ is a mixture of hydrogen and methyl and Z is 1,2-propylene, and X is —NH—, the compound of formula 1 is a derivative of polyalkylene glycol amine such as a Jeffamine™ M polyether available from Huntsman Corporation.

Preferably, R2 and $R^3$ are both 2-hydroxyethyl.

It is also preferred that X is O.

Compounds of formula 1 are typically prepared by reacting a mono-functional polyether with a polyisocyanate in an inert solvent such as toluene at a temperature of from 50 to 100° C. until the desired isocyanate value is reached optionally in the presence of an acid catalyst. In one embodiment, the acid catalyst is present, and in another embodiment, the acid catalyst is absent. The temperature is then normally reduced to between 40 and 60° C. when the requisite secondary amine such as diethanolamine is added.

Useful compounds of formula 1 have been used as component (b) by reacting a poly (propylene glycol) mono methyl ether, a poly (propylene glycol) mono butyl ether or a Jeffamine™ M series polyether having a number average molecular weight of from 250 to 5,000 with a diisocyanate such as TDI followed by diethanolamine.

A second preferred type of compound which can be used as component (b) is of formula 2.

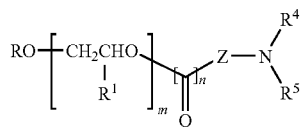

2 wherein

R, $R^1$, Z and m are as defined hereinbefore;

$R^4$ is an isocyanate reactive organic radical (group);

$R^5$ is hydrogen or an isocyanate-reactive organic radical; and n is 0 or 1.

Examples of compounds similar to formula 2 are disclosed in EP 317258.

The organic radical represented by $R^4$ and $R^5$ is an organic radical containing an isocyanate-reactive group, such as —OH, —SH, —COON, —PO$_3$H$_2$ and —NHR$^6$ in which $R^6$ is hydrogen or optionally substituted alkyl. As specific examples of isocyanate-reactive radicals, there may be mentioned hydroxyalkyl, hydroxy alkoxy alkyl, hydroxy (poly alkylene oxy) alkyl and hydroxy alkoxy carbonyl alkyl.

A preferred type of compound of formula 2 is where n is zero, Z is 1,2-propylene, $R^4$ is —CH$_2$CH$_2$C(O)—O-(L)$_q$-H. Wherein L is a hydrocarbyl group or alkoxy group, preferably L is a $C_2$ to $C_3$ hydrocarbyl group or alkoxy group; and q is 1 to 20, preferably 1 to 6 and most preferably 1. $R^5$ is hydrogen. Compounds of this type are obtainable or obtained by the Michael addition reaction of a poly(alkylene oxide) monoalkyl ether monoamine and a hydroxy functional acrylate such as 2-hydroxyethyl acrylate or hydroxypropyl acrylate. A suitable source of poly(alkylene oxide)monoalkyl ether monoamine is the Jeffamine™ M series of polyethers available from Huntsman Corporation. The reaction between the poly(alkylene oxide)mono alkylether monoamine and 2-hydroxy functional acrylate is typically carried out in the presence of air and at a temperature of 50 to 100° C., optionally in the presence of a polymerisation inhibitor such as hydroquinone or butylated hydroxy toluene.

Another preferred type of compound of formula 2 is where n is zero, Z is 1,2-propylene and $R^4$ and $R^5$ are both 2-hydroxyethyl. Compounds of this type may be prepared by reacting a poly(alkylene oxide)mono alkyl ether mono amine with ethylene oxide under acidic conditions.

Yet another preferred type of compound of formula 2 is where n is zero, Z is 1,2-propylene and $R^4$ is —CH$_2$CH$_2$C(O)—O-(L)$_q$-H and $R^5$ is hydrogen. Wherein L is a hydrocarbyl group or alkoxy group, preferably L is a $C_2$ to $C_3$ hydrocarbyl group or alkoxy group; and q is 1 to 20, preferably 1 to 6 and most preferably 1. $R^5$ is hydrogen. Compounds of this type may be prepared by reacting a poly(alkylene oxide) mono alkyl ether mono amine with about one stoichiometric equivalent of ethylene oxide under acidic conditions.

Poly(alkylene oxide)monoalkyl ether monoamines may also be obtained from reaction of a poly(alkylene oxide) monoalkyl ether with acrylonitrile and hydrogen reduction according to the following general scheme where R and $R^1$ are as previously described.

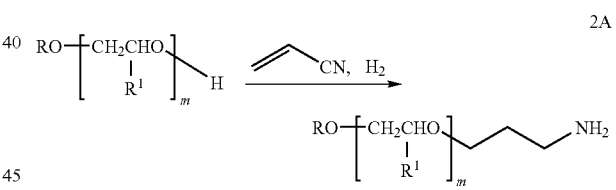

2A

A further preferred type of compound of formula 2 where n is zero, Z is 1,3-propylene and $R^4$ is 2-hydroxyethyl and $R^5$ is hydrogen may be obtained from reaction between poly (alkylene oxide)monoalkyl ether monoamines of formula 2A and a hydroxy functional acrylate such as 2-hydroxyethyl acrylate or hydroxypropyl acrylate.

A third preferred type of compound which may be used as component (b) is of formula 3:

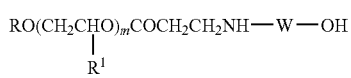

3 wherein R, $R^1$ and in are as defined hereinbefore and W is $C_{2-6}$-alkylene and especially ethylene. Compounds of this type are obtainable or obtained by the Michael addition reaction of a hydroxy amine and a poly(alkylene oxide)acrylate.

A fourth preferred type of compound which may be used as component (b) is of formula 4.

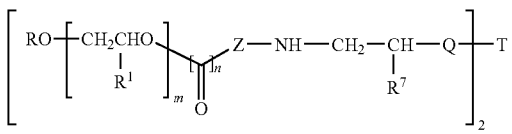

wherein
R, $R^1$, Z, m and n are as defined hereinbefore;
$R^7$ represents hydrogen, halogen or $C_{1-4}$ alkyl;
Q is a divalent electron withdrawing group; and
T is a divalent hydrocarbon radical which may carry substituents or contain hetero atoms.

Examples of electron withdrawing groups which may be represented by Q include —CO—, —COO—, —SO—, —$SO_2$—, —$SO_2O$—— and —$CONR^8$— in which $R^8$ is hydrogen or alkyl.

Hydrocarbon radicals which may be represented by T include alkylene, arylene and mixtures thereof, said radicals optionally carrying substituents or containing hetero-atoms. Examples of suitable radicals represented by T are alkylene radicals containing from 1 to 12 carbon atoms, oxyalkylene and polyoxyalkylene radicals of the formula —$(CH_2CHR^1O)_x$ wherein $R^1$ is as defined hereinbefore and x is from 1 to 10, phenylene and diphenylene radicals and other arylene radicals such as

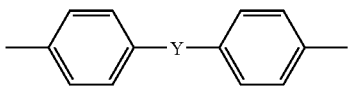

wherein Y is —O—, —S—, —$CH_2$—, —CO— or —$SO_2$—.

The compounds of Formula 4 are obtainable or obtained by the Michael addition reaction of two moles of a poly(alkylene oxide)monoalkyl ether monoamine with one mole of an unsaturated compound of the formula 5.

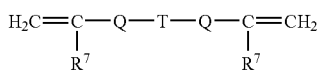

wherein Q, T and $R^7$ are as defined hereinbefore.

Examples of unsaturated compounds of Formula 5 are especially diacrylates and dimethacrylates wherein T is a $C_{4-10}$-alkylene residue, a polyoxyalkylene residue or an oxyethylated Bisphenol A residue.

When component (b) is a polyester containing two groups which react with isocyanates, the polyester chain may be made by polymerising one or more hydroxy carboxylic acids or lactones thereof in the presence of either a hydroxy or carboxy containing compound which acts as a polymerisation terminating moiety.

The polyester obtained using a hydroxy containing compound as chain terminating compound is preferably of formula 6.

wherein
m is as defined hereinbefore;
$R^9$ is $C_{1-50}$-hydrocarbyl group; and
A is $C_{1-26}$-alkylene and/or $C_{2-26}$-alkenylene.

The polyester obtained using a carboxylic containing compound as chain terminating compound is preferably of formula 7.

wherein
$R^9$, A and m are defined hereinbefore.

The polyester of Formulae 6 and/or 7 are typically made by reacting one or more hydroxy carboxylic acids together with either a hydroxy containing compound or carboxy containing compound at 50 to 250° C. in an inert atmosphere and in the presence of an esterification catalyst. Typical process conditions are described in WO 01/80987.

Compounds of Formula 6 may be reacted with a polyisocyanate and a secondary amine under similar conditions described for the preparation of compounds of Formula 1 to form polyester analogues.

Compounds of Formula 7 may be converted to a mono hydroxy compound by reacting with a diol such as ethylene glycol or propylene glycol and the resulting mono hydroxy derivative treated in similar manner to the compound of Formula 6 in preparing polyester analogues to the polyether of Formula 1.

A polyester which contains 2 functional groups which are reactive towards an isocyanate at one end of the polyester may be prepared by the Michael addition of an aminoalcohol with a polyester acrylate such as a polycaprolactone acrylate with ethanolamine.

Monohydroxy functional polymer chains (polyether or polyester may be converted to polymer chains containing both a hydroxyl and imino group at one end by first reaction with an isocyanate functional acrylate followed by a Michael addition of an alkanolamine to the resulting adduct.

The following scheme illustrates such a synthetic conversion starting with a monohydroxy functional polyester.

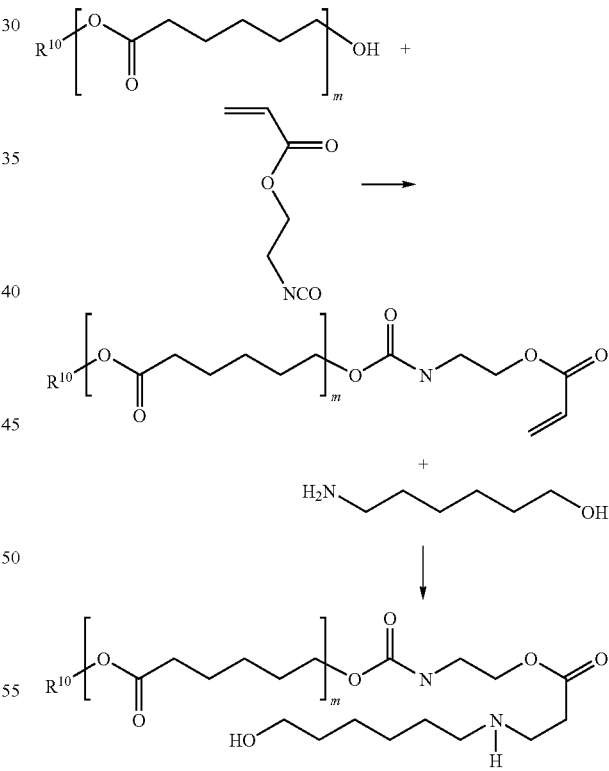

wherein $R^{10}$ and m are as defined hereinbefore.

The structure of component c) is such that when it is incorporated into the polyurethane through reaction with isocyanates a tertiary amine group derived from component c) is laterally attached to the polyurethane backbone such that the tertiary nitrogen atom is separated by at least one atom from the closest atom on the backbone. It is more preferred that the tertiary nitrogen atom is separated by at least two atoms from the closest atom on the backbone and especially preferred that the tertiary nitrogen atom is separated by at least 3 atoms from the closest atom on the backbone.

It is preferred the tertiary nitrogen atom is separated by less than 20 atoms from the closest atom on the backbone. It is more preferred the tertiary nitrogen atom is separated by less than 15 atoms from the closest atom on the backbone. It is especially preferred the tertiary nitrogen atom is separated by less than 10 atoms from the closest atom on the backbone.

Such tertiary amines laterally attached are thought to provide better anchoring to some particulate solids. The tertiary amine may also be partially or fully quaternised to form a quaternary ammonium salt.

Examples of component (c) are:
i) Products formed from the Michael addition of dialkylaminoalkylamines to an α,β-unsaturated carbonyl compound containing a hydroxy functionality. Some examples of suitable dialkylaminoalkylamines may be represented by the formula $R^1(R^2)NR^3NH_2$ where $R^1$ and $R^2$ are independently $C_1$-$C_6$ alkyl moieties. $R^1$ and $R^2$ may be taken together to form a cyclic structure containing 5 to 8 carbon atoms. $R^3$ is $C_1$ to $C_{12}$ linear or branched alkylene. Examples of suitable α,β-unsaturated carbonyl compound containing a hydroxy functionality include hydroxyalkyl acrylates such as hydroxyethyl acrylate, hydroxypropyl acrylate or hydroxybutyl acrylate. A preferred example of component c) is 2-hydroxyethyl 3-{[3-(dimethylamino)propyl]amino}propanoate (compound Z) formed by the reaction of dimethylaminopropylamine with 2-hydroxyethyl acrylate as illustrated below.

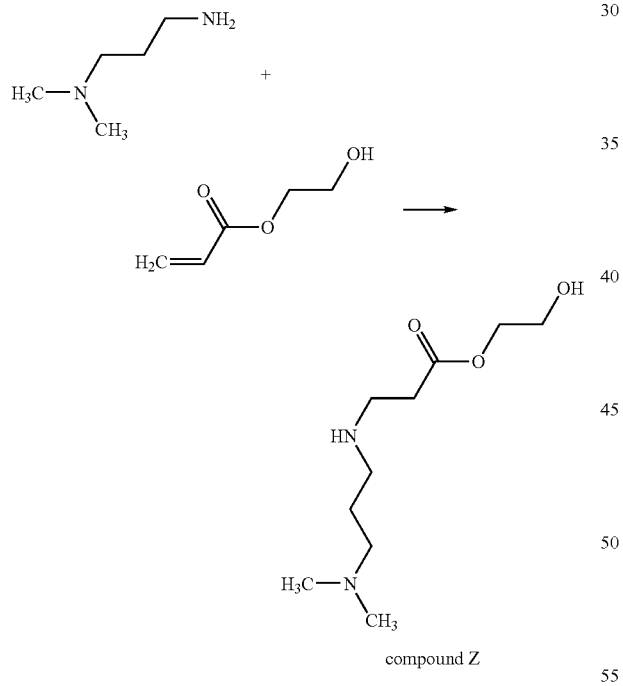

compound Z 1,1'-{[3-(dimethylamino)-propyl]imino}bis-2-propanol

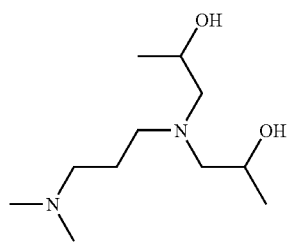

iii) Diethylamino-1,2-propanediol.

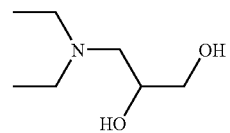

iv) The Michael addition product of a dialkylaminoalkyl acrylate with an amino alcohol. Examples of dialkylaminoalkyl acrylates include dimethylaminoethyl acrylate, dimethylaminopropyl acrylate, diethylaminoethyl acrylate and diethylaminopropyl acrylate. The Michael addition is illustrated in the following reaction scheme using dimethylaminoethyl acrylate and an amino alcohol.

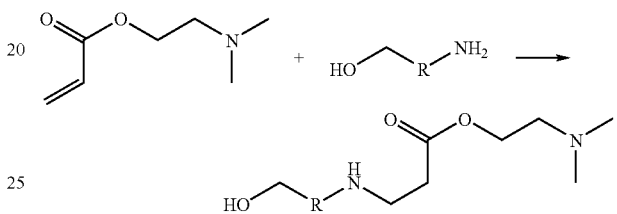

Examples of amino alcohols include C1-C12 alkanolamines where $R=(CH_2)_n$ and $0 \le n \le 11$ or aminoethoxyethanol where $R=CH_2OCH_2CH_2$.

v) 2,2-Bis((diethylamino)methyl)-1,3-propanediol which is an example which would yield 2 pendant tertiary nitrogens in the polyurethane.

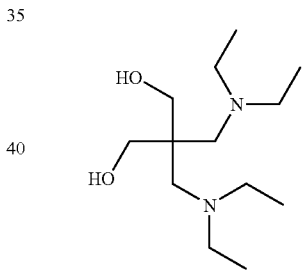

vi) compounds obtainable or obtained by the Michael addition reaction of two moles of a dialkylaminoalkylamine with one mole of an unsaturated compound of the formula 5 as described above.

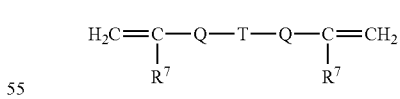

5 wherein Q, T and $R^7$ are as defined hereinbefore.

Examples of unsaturated compounds of Formula 5 are especially diacrylates wherein T is a $C_{4-10}$-alkylene residue, a polyoxyalkylene residue or an oxyethylated Bisphenol A residue.

The formative compounds which are component (d) of the polyurethane are preferably difunctional in respect of reactivity with isocyanates although a small amount of higher functionality may be used where a small amount of branching of the polyurethane polymer backbone is desired. However, it is preferred that component (d) is difunctional. Preferred reactive groups are amino and hydroxy and it is much preferred that component (d) is a diamine or especially a diol. Component (d), if present, is used primarily as a chain extender to alter the solubility of the polyurethane polymer.

Examples of suitable diamines are ethylene diamine, 1,4-butane diamine and 1,6-hexane diamine.

Examples of suitable diols are 1,6-hexanediol, 1,4-cyclohexanedimethanol (CHDM), 1,2-dodecanediol, 2-phenyl-1,2-propanediol, 1,4-benzene dimethanol, 1,4-butanediol and neopentyl glycol. The diol may also be a polyether such as a poly($C_{2-4}$-alkylene glycol), a polyester or polyacrylic diol. The polyalkylene glycol may be a random or block (co) polymer containing repeat ethyleneoxy, propyleneoxy or butyleneoxy groups, including mixtures thereof.

The formative compounds of the dispersant which are component d) may also optionally contain one or more acid groups, including salts thereof. Preferred acid groups are carboxylic acid groups.

When the acid group is in the form of a salt, it may be the salt of an alkali metal such as sodium, potassium or lithium, a salt of an amine such as $C_{1-8}$-alkylamine or $C_{1-8}$-alkanolamine or a salt of a quaternary ammonium cation such as a $C_{1-8}$-alkyl quaternary ammonium cation or benzalkonium cation. Preferably, the acid group, when present, is in the form of the free acid. Preferred examples of carboxylic acid components are dimethylolpropionic acid (DMPA) and dimethylolbutyric acid (DMBA).

The formative compounds of the dispersant which are component d) may also optionally contain one or more amino groups including salts thereof which are not reactive with isocyanates. When the amino group is in the form of a salt, it may be the salt of an inorganic or organic acid. Examples of such acids are hydrochloric acid and acetic acids. The amino group may be quaternised with any known quaternising agent. Preferred quaternising agents are alkyl halides, aralkyl halides, dialkyl carbonates, dialkyl sulphates or epoxides. Particularly preferred quaternising agents are dimethyl sulphate, benzyl chloride or styrene oxide.

As noted hereinbefore, it is preferred that the polyurethane polymer backbone is essentially linear in character. However, some small amount of branching may be tolerated and this branching may conveniently be introduced by means of a higher functional polyol such as timethylol propane, trimethylolethane or pentaerythritol.

As disclosed hereinbefore, the chain terminating compound which is component (e) is mono-functional with respect to the isocyanate. The monofunctional group is preferably an amino or hydroxy group. Preferred terminating groups are poly($C_{2-4}$-alkylene) mono alkyl ethers and mono alkyl ether amines similar to those used in the preparation of the lateral side chain compounds which are component (b) of the polyurethane.

An example of a monoisocyanate which acts as a chain terminating compound (component f) is phenyl isocyanate.

It is much preferred that the amount of component (f) is zero.

Typical amounts of the aforementioned compounds from which the polyurethane polymers are obtainable are 10-50% component (a), 10-80% component (b), 1-24% component (c), 0-25% component (d), 0-50% component (e) and 0-20% component (f), all based on the total weight of the polyurethane polymer.

When component (e) is a monofunctional polyether, polyester, poly(alk)acrylate or polyolefin the total amount of component (b) with component (e) is preferably not less than 35% and where component (e) is other than a monofunctional polyether, polyester or poly(alk)acrylate the amount of component (b) is preferably not less than 35%.

The polyurethane polymers according to the invention may be prepared by any method known to the art. Typically, the polyurethane polymer is obtainable or obtained by reacting one or more isocyanates having a functionality of from 2.0 to 2.5 (component (a)) with one or more compounds selected from polyethers having a poly($C_{2-4}$-alkylene oxide) chain, polyester, polyacrylic, or polyolefin, each characterized by having at least two groups which react with isocyanates which are located at one end (component (b)) under substantially anhydrous conditions and in an inert atmosphere which is typically a temperature between 0 and 130° C., optionally in the presence of an inert solvent and optionally in the presence of a catalyst. Optionally, the reaction may also be carried out in the presence of one or more compounds having at least one acid or amine group (component (c)) and one or more formative compounds acting as chain extenders (component (d)) and optionally one or more compounds which act as chain terminating compounds which are components (e) and (f).

The inert atmosphere may be provided by any of the inert gases of the Periodic Table but is preferably nitrogen.

The preparation of the polyurethane polymer/prepolymer may be carried out in the presence of a catalyst. Particularly preferred catalysts are tin complexes of aliphatic acids such as dibutyl tin dilaurate (DBTDL) and tertiary amines.

The essential feature of the polyurethane polymer according to the invention is that it comprises a predominantly linear polyurethane polymer backbone containing the defined amount of lateral polymeric side chains which may poly(alkylene oxide), polyester, poly(alk)acrylate or polyolefin. There will thus be many variants which will be obvious to the skilled addressee regarding the ratio of isocyanate groups to isocyanate reactive groups including the formulation of prepolymers which have residual isocyanate functionality. In one case, the ratio of total isocyanate groups provided by component (a) is less than the total number of isocyanate reactive groups provided by component (b) and components (c) (d) and (e) when present. Any terminal isocyanate reactive groups may be reacted.

Alternatively, the ratio of total number of isocyanate groups provided by component (a) and optionally component (f) is greater that the total number of isocyanate reactive groups provided by component (b) and components (c), (d) and (e) when present. The resultant polyurethane is then a prepolymer containing residual isocyanate functionality. This prepolymer may then be reacted with other chain extenders such as component (d) which conjoins different prepolymer chains and/or with chain terminating compounds which are component (e), optionally prior to or during dissolution in solvent. In one embodiment, prepolymer is reacted with chain extenders prior to dissolution in solvent. In one embodiment, prepolymer is reacted with chain extenders during dissolution in solvent. In one embodiment, prepolymer is reacted with chain extenders in the absence of solvent.

The preparation of prepolymers can be useful since it is a means of controlling viscosity during the preparation of the polyurethane polymer, especially in circumstances where the reaction is carried out in the absence of any solvent.

When a prepolymer is formed which contains isocyanate functionality, chain extension may be carried out by water itself, or a polyol, amino-alcohol, a primary or secondary aliphatic, alicyclic, aromatic, aralyphatic or heterocyclic polyamine especially a diamine, hydrazine or a substituted hydrazine.

Examples of suitable chain extenders include ethylenediamine, diethylene triamine, triethylene tetramine, propylenediamine, butylenediamine, hexamethylenediamine, cyclohexylenediamine, piperazine, 2-methyl piperazine, phenylenediamine, tolylene diamine, xylylene diamine, tris (2-aminoethy)amine, 3,3'-dinitrobenzidine, 4,4'methylenebis (2-chloraniline), 3,3'-dichloro-4,4'bi-phenyl diamine, 2,6-diaminopyridine, 4,4'-diaminodiphenylmethane, methane diamine, m-xylene diamine, isophorone diamine, and adducts of diethylene triamine with acrylate or its hydrolyzed products. Also materials such as hydrazine, azines such as acetone azine, substituted hydrazines such as, for example, dimethyl hydrazine, 1,6-hexamethylene-bis-hydrazine, carbodihydreazine, hydrazides of dicarboxylic acids and sulphonic acid such as adipic acid mono- or dihydrazide, xalic acid dihydrazide, isophthalic acid dihydrazide, tartaric acid dihydrazide, 1,3-phenylene disulphonic acid dihydrazide, omega-aminocaproic acid dihydrazide, hydrazides made by reacting lactones with hydrazide such as gamma-hydroxylbutyric hydrazide, bis-semi-carbazide carbonic esters of glycols such as any of the glycols mentioned above. Hexamethylenediamine is especially preferred.

The chain extension can be conducted at elevated, reduced or ambient temperatures. Convenient temperatures are from about 5° C. to 95° C.

When employing a prepolymer in the preparation of the polyurethane polymer, the amount of chain extender and chain terminating compound are chosen to control the molecular weight of the polyurethane polymer. A high molecular weight will be favoured when the number of isocyanate-reactive groups in the chain extender is approximately equivalent to the number of free isocyanate groups in the prepolymer. A lower molecular weight of the polyurethane polymer is favoured by using a combination of chain extender and chain terminator in the reaction with the polyurethane prepolymer.

An inert solvent may be added before, during or after formation of the polyurethane polymer/prepolymer in order to control viscosity. Examples of suitable solvents are acetone, methylethylketone, dimethylformamide, dimethylacetamide, diglyme, N-methylpyrrolidone, butylacetate, methoxypropyl acetate, ethylacetate, ethylene and propylene glycoldiacetates, alkyl ethers of ethylene and propylene glycol acetates, toluene, xylene and sterically hindered alcohols such as t-butanol and diacetone alcohol. Preferred solvents are ethyl acetate, butyl acetate, methoxy propylacetate and N-methyl pyrrolidone.

The number average molecular weight of the polyurethane polymer is preferably not less than 2,000, more preferably not less than 3,000 and especially not less than 4,000. It is also preferred that the number average molecular weight of the polyurethane polymer is not greater than 50,000, more preferably not greater than 30,000 and especially not greater than 20,000.

As noted hereinbefore, some of the polyurethane dispersants are novel. Hence, as a further aspect of the invention, there is provided a polyurethane dispersant having an essentially linear backbone and laterally attached solvent-solubilising polyether side chains of poly($C_{2-4}$-alkylene oxide) which contains less than 60% by weight ethylene oxide relative to the poly($C_{2-4}$-alkylene oxide) chain. In one preferred sub-group of such dispersants, the poly($C_{2-4}$-alkylene oxide) chain is the residue of a polyether which contains one hydroxyl and one imino (secondary amine) group at one end of the polyether chain which reacts with isocyanates. In a second preferred sub-group of polyether dispersants, the poly($C_{24}$-alkylene oxide) chain is the residue of a polyether which contains two hydroxyl groups at one end of the polyether chain which react with isocyanates and which are separated by not less than 5 atoms.

As a still further aspect of the invention, there is provided a polyurethane dispersant having an essentially linear backbone and laterally attached solvent-solubilising polyester side chains. In one preferred sub-group of such polyester dispersants, the polyester side chain is the residue of a polyester which contains two hydroxyl groups at one end of the polyester chain which react with isocyanates and which are preferably separated by from 5 to 17 atoms.

Industrial Application

Dispersions and mill bases made from the composition of the invention are particularly suitable for use in paints, including high solids paints, inks, especially flexographic, gravure and screen inks, colour filter layers for display screen equipment and non-aqueous ceramic processes.

The following examples provide an illustration of the invention. These examples are non exhaustive and are not intended to limit the scope of the invention. Unless expressed to the contrary all references are to parts by weight.

EXAMPLES

Intermediate A

Jeffamine M2005 (200 parts, ex Huntsman), 2-hydroxyethyl acrylate (11.61 parts) and 2,6-di-tertbutyl-4-methyl phenol (0.03 parts) were stirred together for 48 hours at 70° C. until the Michael addition reaction was complete. This is Intermediate A.

Intermediate B

1-Dodecanol (64.1 parts) and ϵ-caprolactone (509.97 parts) were stirred together under nitrogen at 150° C. Zirconium butoxide catalyst (2.9 parts) was added and the reactants were heated to 180° C. and stirring maintained for 20 hours. After cooling to 20° C., the resulting polyester was obtained as a waxy solid. This is Intermediate B.

Intermediate C

Tolylene diisocyanate (41.71 parts) was added to a reaction vessel heated to 50° C. under nitrogen. Intermediate B (400 parts) was mixed with ethyl acetate (400 parts) and warmed to 50° C. in an oven then added to the reaction vessel over 2 hrs with agitation at 50-60° C. The reaction was continued with stirring at 60° C. for 1 hour. The reactants were then cooled to 20° C. and diethanolamine (25.18 parts) was added. The reaction was continued with stirring at 35° C. until no isocyanate remained. The ethyl acetate was then removed on a rotary evaporator then residual solvent removed in a vacuum oven. This is Intermediate C.

Intermediate D

3-Dimethyamino-1-propylamine (400 parts) was charged to a reaction vessel and cooled to 0° C. 2-Hydroxyethyl acrylate (454.57 parts) was charged to a dropping funnel and added to the reaction vessel over a period of 3 hours until the Michael addition reaction was complete. This is intermediate D.

Intermediate E

Ethanolamine (30.54 parts) and 2-tert-butyl-4-methylphenol (0.01 parts) were charged to a reaction vessel then cooled to 0° C. 2-(Dimethylamino)ethyl acrylate (71.59 parts) was charged to a dropping funnel and added to the reaction vessel over a period of one hour maintaining the reaction temperature at 0° C. The temperature was then raised to 50° C. for 1 hour and then raised to 70° C. for 4 hours until the Michael addition reaction was complete. This is intermediate E.

Intermediate F

3-Amino-1-propanol (37.56 parts) and 2-tert-butyl-4-methylphenol (0.01 parts) were charged to a reaction vessel then cooled to 0° C. 2-(Dimethylamino)ethyl acrylate (71.59 parts) was charged to a dropping funnel and added to the reaction vessel over a period of one hour maintaining the reaction temperature at 0° C. The temperature was then raised to 50° C. for 1 hour and then raised to 70° C. for 4 hours until the Michael addition reaction was complete. This is intermediate F.

Intermediate G 2-(2-aminoethoxy)ethanol (42.07 parts) and 2-tert-butyl-4-methylphenol (0.01 parts) were charged to a reaction vessel then cooled to 0° C. 2-(Dimethylamino)ethyl acrylate (57.27 parts) was charged to a dropping funnel and added to the reaction vessel over a period of one hour maintaining the reaction temperature at 0° C. The temperature was then raised to 50° C. for 1 hour and then raised to 70° C. for 4 hours until the Michael addition reaction was complete. This is intermediate G.

Intermediate H

6-Amino-1-hexanol (35.16 parts) and 2-tert-butyl-4-methylphenol (0.01 parts) were charged to a reaction vessel and heated to 70 ° C. 2-(Dimethylamino)ethyl acrylate (42.96 parts) was then added dropwise over 1 hour until the Michael addition reaction was complete. This is intermediate H.

Intermediate I 3-(Diethylamino)propylamine (39.07 parts) was charged to a flask and cooled to 0° C. 2-tert-butyl-4-methylphenol (0.01 parts) was dissolved in 2-hydroxyethyl acrylate (34.84 parts) and charged to a dropping funnel then added to the reaction vessel over a period of 1 hour maintaining the temperature at 0° C. The temperature was then raised to 50° C. for 1 hour and then raised to 70° C. for 4 hours until the Michael addition reaction was complete. This is intermediate I.

Intermediate J 3-(Dibutylamino)propylamine (55.9 parts) was charged to a flask and cooled to 0° C. 2-tert-butyl-4-methylphenol (0.01 parts) was dissolved in 2-hydroxyethyl acrylate (34.84 parts) and charged to a dropping funnel then added to the reaction vessel over a period of 1 hour maintaining the temperature at 0° C. The temperature was then raised to 50° C. for 1 hour and then raised to 70° C. for 4 hours until the Michael addition reaction was complete. This is intermediate J.

Intermediate K

Jeffamine M600 (100 parts, ex Huntsman), 2-hydroxyethyl acrylate (19.03 parts) and were stirred together for 20 hours at 80° C. until the Michael addition reaction was complete. This is Intermediate K.

Intermediate L

1-Dodecanol (114.6 parts), ε-caprolactone (666.73 parts) and δ-valerolactone (215.44 parts) were stirred together under nitrogen at 150° C. Zirconium butoxide catalyst (4.0 parts) was added and the reactants were heated to 180° C. and stirring maintained for 20 hours. After cooling to 20° C., the resulting polyester was obtained as a waxy solid. This is Intermediate L.

Intermediate M

Tolylene diisocyanate (85.97 parts) was added to a reaction vessel heated to 50° C. under nitrogen. Intermediate L (800 parts) was warmed to 50° C. in an oven then added to the reaction vessel over 2 hrs with agitation at 50-60° C. The reaction was continued with stirring at 60° C. for 1 hour. The reactants were then cooled to 20° C. and diethanolamine (51.90 parts) was added. The reaction was continued with stirring at 35° C. until no isocyanate remained. This is Intermediate M.

In the following examples, the molecular weight of the dispersants produced was characterized by gel permeation chromatography using tetrahydrofuran containing 1 wt. % of triethylamine as eluent. The number average molecular weight (Mn) and weight average molecular weight (Mw) values were determined relative to polystyrene standards. For polymerizations carried out in solvent the final solids content of the solution was determined by gravimetric analysis.

Comparative Example 1

Tolylene-2,4-diisocyanate (21.10 parts, technical grade, 80%) was charged to a reaction vessel, under nitrogen, followed by methoxypropyl acetate (154.05 parts), Intermediate A (80.30 parts) and N-methyldiethanolamine (8.6 parts). The mixture was heated to 70° C. with agitation. Jeffmaine M2005 (44.05 parts, ex Hunstman) was added and the reaction mixture was held at 70° C. for 2 hrs at which point no isocynate remained. 100 parts of the resulting solution were removed from the reaction vessel. GPC analysis of this material gave molecular weight values of Mn 13,300 and Mw 30,200. Benzyl chloride (5.6 parts) was charged to the residual solution in the reaction vessel which was held at 70° C. for 20 hrs with agitation to yield the quaternised PU dispersant with solids content 49.4 wt %.

Comparative Example 2

Tolylene-2,4-diisocyanate (31.39 parts, technical grade, 80%) was charged to a reaction vessel, under nitrogen, followed by methoxypropyl acetate (154.04 parts), Intermediate A (80.30 parts) and N-methyldiethanolamine (17.28 parts). The mixture was heated to 70° C. with agitation. Jeffmaine M2005 (65.54 parts, ex Hunstman) was added and the reaction mixture was held at 70° C. for 2 hrs at which point no isocyanate remained. 100 parts of the resulting solution were removed from the reaction vessel. GPC analysis of this material gave molecular weight values of Mn 9,300 and Mw 19,600. Benzyl chloride (5.6 parts) was charged to the residual solution in the reaction vessel which was held at 70° C. for 20 hrs with agitation to yield a quaternised PU dispersant with solids content 49.8 wt. %.

Example 1

Tolylene-2,4-diisocyanate (20.52 parts, technical grade, 80%) was charged to a reaction vessel, under nitrogen, followed by methoxypropyl acetate (152.84 parts), Intermediate A (73.70 parts) and 1,1'-{[3-(dimethylamino)-propyl]

imino}bis-2-propanol (15.78 parts). The mixture was heated to 70° C. with agitation. Jeffmaine M2005 (42.84 parts, ex Hunstman) was added and the reaction mixture was held at 70° C. for 2 hours at which point no isocyanate remained. 100 parts of the resulting solution were removed from the reaction vessel. GPC analysis of this material gave molecular weight values of Mn 8,700 and Mw 14,700. Benzyl chloride (5.5 parts) was charged to the residual solution in the reaction vessel which was held at 70° C. for 20 hrs with agitation to yield a quaternised PU dispersant with solids content 54.8 wt. %.

Example 2

Tolylene-2,4-diisocyanate (20.52 parts, technical grade, 80%) was charged to a reaction vessel, under nitrogen, followed by methoxypropyl acetate (152.85 parts), Intermediate A (73.70 parts) and Intermediate D (15.78 parts). The mixture was heated to 70° C. with agitation. Jeffmaine M2005 (42.85 parts, ex Hunstman) was added and the reaction mixture was held at 70° C. for 2 hrs at which point no isocyanate remained. 100 parts of the resulting solution were removed from the reaction vessel. GPC analysis of this material gave molecular weight values of Mn 6,000 and Mw 15,200. Benzyl chloride (5.6 parts) was charged to the residual solution in the reaction vessel which was held at 70° C. for 20 hrs with agitation to yield a quaternised PU dispersant with solids content 51.1 wt. %.

Example 3

Tolylene-2,4-diisocyanate (22.72 parts, technical grade, 80%) was charged to a reaction vessel, under nitrogen, followed by methoxypropyl acetate (159.6 parts), Intermediate C (80.40 parts) and 1,1'-{[3-(dimethylamino)-propyl]imino}bis-2-propanol (16.88 parts). The mixture was heated to 70° C. with agitation. Intermediate B (39.6 parts) was added and the reaction mixture was held at 70° C. for 2 hrs at which point no isocyanate remained. 100 parts of the resulting solution were removed from the reaction vessel. GPC analysis of this material gave molecular weight values of Mn 6,200 and Mw 18,100. Benzyl chloride (6.0 parts) and methoxypropyl acetate (6.0 parts) was charged to the residual solution in the reaction vessel which was held at 70° C. for 20 hrs with agitation to yield a quaternised PU dispersant with solids content 50.9 wt. %.

Example 4

Tolylene-2,4-diisocyanate (23.25 parts, technical grade, 80%) was charged to a reaction vessel, under nitrogen, followed by methoxypropyl acetate (125.43 parts), Intermediate A (56.20 parts) and Intermediate E (20.55 parts). The mixture was heated to 70° C. with agitation. Jeffamine M2005 (25.43 parts, ex Hunstman) was added and the reaction mixture was held at 70° C. for 2 hours at which point no isocyanate remained. 150 parts of the resulting solution were removed from the reaction vessel. GPC analysis of this material gave molecular weight values of Mn 3000 and Mw 7300. Benzyl chloride (2.32 parts) was charged to the residual solution in the reaction vessel which was held at 70° C. for 20 hrs with agitation to yield a quaternised PU dispersant with solids content 48.1%.

Example 5

Tolylene-2,4-diisocyanate (22.61 parts, technical grade, 80%) was charged to a reaction vessel, under nitrogen, followed by methoxypropyl acetate (124.73 parts), Intermediate A (56.20 parts) and Intermediate F (21.19 parts). The mixture was heated to 70° C. with agitation. Jeffmaine M2005 (24.73 parts, ex Hunstman) was added and the reaction mixture was held at 70° C. for 2 hours at which point no isocyanate remained. 150 parts of the resulting solution were removed from the reaction vessel. GPC analysis of this material gave molecular weight values of Mn 3600 and Mw 8200. Benzyl chloride (2.43 parts) was charged to the residual solution in the reaction vessel which was held at 70° C. for 20 hrs with agitation to yield a quaternised PU dispersant with solids content 47.8%.

Example 6

Tolylene-2,4-diisocyanate (21.37 parts, technical grade, 80%) was charged to a reaction vessel, under nitrogen, followed by methoxypropyl acetate (123.37 parts), Intermediate A (56.20 parts) and Intermediate G (22.43 parts). The mixture was heated to 70° C. with agitation. Jeffmaine M2005 (23.37 parts, ex Hunstman) was added and the reaction mixture was held at 70° C. for 2 hours at which point no isocyanate remained. 150 parts of the resulting solution were removed from the reaction vessel GPC analysis of this material gave molecular weight values of Mn 4400 and Mw 10600. Benzyl chloride (2.16 parts) was charged to the residual solution in the reaction vessel which was held at 70° C. for 20 hrs with agitation to yield a quaternised PU dispersant with solids content 49.0%.

Example 7

Tolylene-2,4-diisocyanate (26.48 parts, technical grade, 80%) was charged to a reaction vessel, under nitrogen, followed by methoxypropyl acetate (111.94 parts), Intermediate K (56.20 parts) and Intermediate H (17.32 parts). The mixture was heated to 70° C. with agitation. Jeffamine M600 (11.94 parts, ex Hunstman) was added and the reaction mixture was held at 70° C. for 2 hrs at which point no isocyanate remained. 174 parts of the resulting solution were removed from the reaction vessel. GPC analysis of this material gave molecular weight values of Mn 4200 and Mw 10600. Benzyl chloride (1.67 parts) was charged to the residual solution in the reaction vessel which was held at 70° C. for 20 hrs with agitation to yield a quaternised PU dispersant with solids content 54.8 wt %.

Example 8

Tolylene-2,4-diisocyanate (21.77 parts, technical grade, 80%) was charged to a reaction vessel, under nitrogen, followed by methoxypropyl acetate (125.19 parts), Intermediate M (56.20 parts) and Intermediate I (22.03 parts). The mixture was heated to 70° C. with agitation. Intermediate L (25.19 parts) was added and the reaction mixture was held at 70° C. for 2 hrs at which point no isocyanate remained. 200 parts of the resulting solution were removed from the reaction vessel. GPC analysis of this material gave molecular weight values of Mn 10100 and Mw 20200. Benzyl chloride (2.11 parts) was charged to the residual solution in the reaction vessel which was held at 70° C. for 20 hrs with agitation to yield a quaternised PU dispersant with solids content 50 wt. %.

Example 9

Tolylene-2,4-diisocyanate (12.93 parts, technical grade, 80%) was charged to a reaction vessel, under nitrogen, followed by methoxypropyl acetate (112.38 parts), Intermediate M (33.72 parts) and Intermediate J (13.35 parts). The mixture was heated to 70° C. with agitation. Intermediate L (52.38 parts) was added and the reaction mixture was held at 70° C. for 2 hrs at which point no isocyanate remained. 175 parts of the resulting solution were removed from the reaction vessel. GPC analysis of this material gave molecular weight values of Mn 6700 and Mw 15500. Benzyl chloride (1.14 parts) was charged to the residual solution in the reaction vessel which was held at 70° C. for 20 hrs with agitation to yield a quaternised PU dispersant with solids content 50 wt. %.

Example 10

Tolylene-2,4-diisocyanate (26.68 parts, technical grade, 80%) was charged to a reaction vessel, under nitrogen, followed by methoxypropyl acetate (130.87 parts), Intermediate M (56.20 parts) and 3-(diethylamino)-1,2-propanediol (17.12 parts). The mixture was heated to 70° C. with agitation. Jeffamine M2005 (30.87 parts, ex Huntsman) was added and the reaction mixture was held at 70° C. for 2 hrs at which point no isocyanate remained. 211 parts of the resulting solution were removed from the reaction vessel. GPC analysis of this material gave molecular weight values of Mn 7800 and Mw 27000. Benzyl chloride (2.43 parts) was charged to the residual solution in the reaction vessel which was held at 70° C. for 20 hrs with agitation to yield a quaternised PU dispersant with solids content 49.7 wt. %.

Example 11

Tolylene-2,4-diisocyanate (37.17 parts, technical grade, 80%) was charged to a reaction vessel, under nitrogen, followed by Intermediate A (82.50 parts) and 1,1'-{[3-(dimethylamino)-propyl]imino}bis-2-propanol (30.33 parts). The mixture was heated to 70° C. with agitation. Intermediate L (115.14 parts) was added and the reaction mixture was held at 70° C. for 2 hrs at which point no isocyanate remained. 211 parts of the resulting product were removed from the reaction vessel GPC analysis of this material gave molecular weight values of Mn 9500 and Mw 17300. Benzyl chloride (1.49 parts) and methoxypropyl acetate (50 parts) were charged to the residual product in the reaction vessel which was held at 70° C. for 20 hrs with agitation to yield a quaternised PU dispersant with solids content 48.3 wt. %.

Pigment Dispersion Performance

A blend of solvents xylene, methoxypropyl acetate and butyl acetate was prepared in weight ratio of 1:1:1. Pigment dispersants 1-3 were compared to the comparative examples 1 and 2 in a blend of solvents.

Pigment dispersions were prepared by adding the materials detailed in the following Table 1 to a 4 oz. glass jar in the order listed. In each case, the pigment loading was 35 wt. % and the active content of the dispersant was 18 wt. % based on the mass of pigment used.

In each case the mixture was gently stirred to wet out the pigment. 125 parts of 3 mm diameter glass beads were added to the jar. The jar was placed in a Scandex disperser model 200-K and the contents milled by oscillatory shaking for 1 hour.

The viscosity of the dispersions was determined over a range of shear rates using a Bohlin Visco V88 Viscometer with a 2.5°/15 mm cone geometry. The viscosity vs. shear rate data is shown in the attached FIG. 1.

It is clearly evident that the pigment dispersions made with the comparative example dispersants have significantly higher viscosity at low shear rates and are more pseudoplastic than those made with dispersants of this invention.

A polyurethane coating formulation was prepared from each of the millbase dispersions prepared above by mixing the following components:

TABLE 2

| | Parts by weight |
|---|---|
| Desmophen A760 | 10.94 |
| Solvent (xylene/butyl acetate/methoxypropyl acetate 1/1/1) | 2.22 |
| Pigment Dispersion | 4.82 |
| Desmodur N3390* | 0.44 |

*Polyisocyanate supplied by Bayer

The resulting coating formulations were drawn down onto Leneta black and white card using an automatic film applicator fitted with a number 4 K bar. The coatings were allowed to air dry. Gloss and Haze of the coatings were measured using a Byk Gardner 4600 Haze-gloss meter. Colour strength was measured on a Macbeth Coloureye XTH Spectrophotometer. Transparency was visually assessed in a VeriVide visual assessing cabinet, under a Standard D65 illumination. The results are shown in the following Table 3.

TABLE 3

| | 60° Gloss | 20° Gloss | HAZE | Visual Transparency.♥ | % strength♪ |
|---|---|---|---|---|---|
| Coating Comparative 1 | 102 | 76 | 262 | 0 | 100 |
| Coating Comparative 2 | 56 | 23 | 369 | −1 | 30 |
| Coating Example 1 | 101 | 81 | 197 | 2.5 | 263 |

TABLE 1

| | Pigment Dispersion Comparative 1 | Pigment Dispersion Comparative 2 | Pigment Dispersion Example 1 | Pigment Dispersion Example 2 | Pigment Dispersion Example 3 |
|---|---|---|---|---|---|
| Cromophtal Red A3B# | 6.30 | 6.30 | 6.30 | 6.30 | 6.30 |
| Dispersant Comparative 1 | 2.52 | | | | |
| Dispersant Comparative 2 | | 2.52 | | | |
| Dispersant Example 1 | | | 2.80 | | |
| Dispersant Example 2 | | | | 2.47 | |
| Dispersant example 3 | | | | | 2.47 |
| Desmophen A760## | 8.75 | 8.75 | 8.75 | 8.75 | 8.75 |
| Solvent (xylene/butyl acetate/methoxypropyl acetate 1/1/1) | 17.43 | 17.43 | 17.15 | 17.48 | 17.48 |
| Total | 35.00 | 35.00 | 35.00 | 35.00 | 35.00 |

Pigment red 177 supplied by Ciba
Hydroxy functional polyacrylale supplied by Bayer TABLE 3-continued

| | 60° Gloss | 20° Gloss | HAZE | Visual Transparency.♥ | % strength♦ |
|---|---|---|---|---|---|
| Coating Example 2 | 104 | 84 | 192 | 2 | 164 |
| Coating Example 3 | 105 | 92 | 163 | 4.5 | 279 |

♥Transparency of coating comparative 1 was assigned an arbitrary value of 0. Positive values represent higher transparency, negative values more opaque. For the red A3B pigment high transparency is the desired property.

♦Colour strength of coating comparative 1 defined as 100%. Values for other panels are determined relative to coating comparative 1.

As can be seen from the data, the properties of coatings based on the dispersants of this invention are significantly improved over the comparative examples both in terms of transparency and colour strength.

Dispersions were prepared by dissolving dispersants 1-11 (1.0 parts) in butyl acetate (7.0 parts). 3 mm Diameter glass beads (20 parts) and red pigment (2.0 parts, Paliogen Maroon L3920, ex BASF) were added and the contents milled on a horizontal shaker for 16 hours. All the resultant mill bases exhibited excellent fluidity.

TABLE 4

| Example | Fluidity |
|---|---|
| 1 | very fluid |
| 2 | very fluid |
| 3 | very fluid |
| 4 | very fluid |
| 5 | very fluid |
| 6 | very fluid |
| 7 | very fluid |
| 8 | very fluid |
| 9 | very fluid |
| 10 | very fluid |
| 11 | very fluid |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to he understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A non-aqueous composition, comprising a particulate solid, an organic medium and a polyurethane dispersant, having an essentially linear backbone derived from polyisocyanates having a functionality from 2.0 to 2.1, laterally attached solvent-solubilising side chains of a polyester or polyether including mixtures of such side chains, and pendant side chains with tertiary amines derived from a tertiary amino group of the formula

including salts thereof; wherein $R^\alpha$ and $R^\beta$ are each independently alkyl, aralkyl, cycloalkyl or aryl and do not contain groups which can react with isocyanates; $R^\alpha$ and $R^\beta$ may be taken together to form a cyclic structure containing 5 to 8 carbon atoms and $R^\gamma$ is a moiety that contains at least two groups which react with isocyanates.

2. The composition as claimed in claim 1 wherein said pendant side chains with tertiary amines are separated from said essentially linear backbone by at least one atom and said tertiary amines are at least partially quaternized.

3. The composition as claimed in claim 1, wherein said tertiary amines are separated from said essentially linear backbone by less than 20 atoms.

4. The composition of claim 1, wherein said tertiary amines are separated from said essentially linear backbone by 3 to 10 carbon atoms and at least 20 mole % of said tertiary amines are quaternized.

5. The composition of claim 1 wherein the solvent-solubilising side-chains comprise at least one polyether chain that is poly($C_{2-4}$-alkylene oxide) containing less than 60% by weight ethylene oxide and wherein said polyether chain is the residue of a polyether which contained at one end of the polyether either two hydroxyl groups or one hydroxyl group and one secondary amino group, which groups react with isocyanates.

6. The composition of claim 1 wherein the solvent-solubilising side chains comprise at least one polyester chain that is obtainable or obtained from a hydroxy carboxylic acid or lactone thereof containing from 1 to 26 carbon atoms, including mixtures thereof and wherein said polyester chain is the residue of a polyester which contained at one end two hydroxyl groups.

7. The composition of claim 6 wherein the lactone is ε-caprolactone or δ-valerolactone or mixtures thereof.

8. The composition of claim 1 wherein the number-average molecular weight of the polyester or polyether side chain is from 300 to 10,000 Daltons.

9. The composition of claim 1 wherein the polyurethane dispersant additionally comprises from 10 to 180 milliequivalents for each 100g dispersant of tertiary amine groups within said pendant side chains.

10. The composition of claim 1 wherein the total weight percentage of solvent-solubilising lateral side chains is not less than 5% based on the total weight of polyurethane dispersant.

11. The composition of claim 2, wherein the solvent-solubilising chains comprises at least one polyether chain that contains the residue of a compound of formula 1

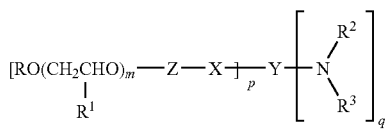

wherein
R is $C_{1-20}$-hydrocarbyl group;
$R^1$ is hydrogen, methyl or ethyl of which less than 60% is hydrogen;
$R^2$ and $R^3$ are each, independently, $C_{1-8}$-hydroxyalkyl;
Z is $C_{2-4}$-alkylene;
X is —O— or —NH—;
Y is the residue of a polyisocyanate;
m is from 5 to 150;
p is from 1 to 4; and
q is 1 or 2.

12. The composition of claim 2, wherein the solvent solubilising chains comprise at least one polyether chain that contains the residue of a compound of formula 2

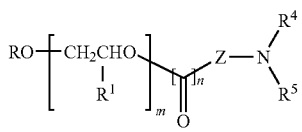

wherein
R is $C_{1-20}$-hydrocarbyl group;
$R^1$ is hydrogen, methyl or ethyl of which less than 60% is hydrogen;
$R^4$ is an isocyanate reactive organic radical;
$R^5$ is hydrogen or an isocyanate-reactive organic radical;
Z is $C_{2-4}$-alkylene
m is from 5 to 150; and
n is 0 to 1.

13. The composition of claim 2, wherein the solvent-solubilising chains comprise at least one polyether chain that contains the residue of a compound of formula 3

wherein
R is $C_{1-20}$-hydrocarbyl group;
$R^1$ is hydrogen, methyl or ethyl of which less than 60% is hydrogen;
W is $C_{2-6}$-alkylene; and
m is from 5 to 150.

14. The composition of claim 2 wherein the laterally attached solvent-solubilising chains comprise at least one polyester side chain that is the residue of a compound of formula 6

$$R^9O(OC\text{-}A\text{-}O)_m H \qquad 6$$

wherein
$R^9$ is $C_{1-50}$-hydrocarbyl group;
A is $C_{1-26}$-alkylene and/or $C_{2-26}$-alkenylene; and
m is from 5 to 150.

15. A non-aqueous millbase, paint or ink which comprises a film-forming resin and the composition of claim 1.

* * * * *